Oct. 25, 1932.  G. E. McCLOSKEY  1,884,048
FUME ARRESTER FOR CUPOLA FURNACES
Filed Dec. 29, 1930
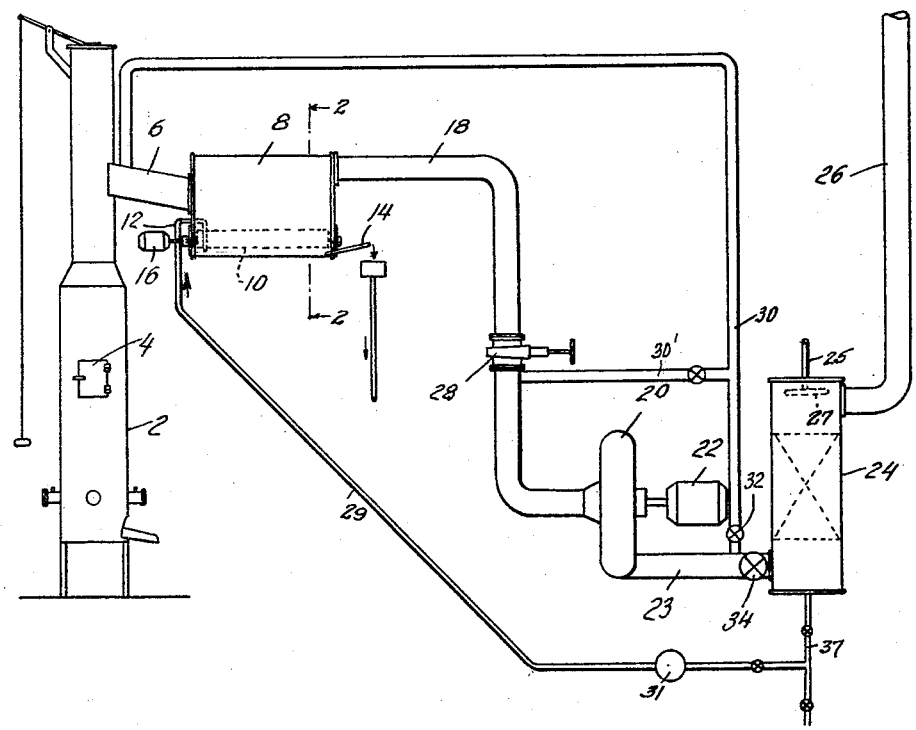
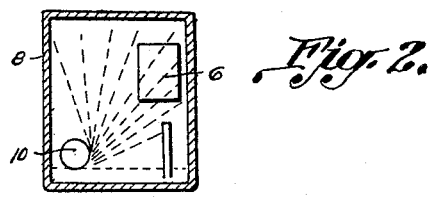
INVENTOR
Gregory E. McCloskey
BY
ATTORNEY Patented Oct. 25, 1932

1,884,048

UNITED STATES PATENT OFFICE

GREGORY EDWARD McCLOSKEY, OF SOUTH ORANGE, NEW JERSEY, ASSIGNOR TO THE BARRETT COMPANY, OF NEW YORK, N. Y., A CORPORATION OF NEW JERSEY

FUME ARRESTER FOR CUPOLA FURNACES

Application filed December 29, 1930. Serial No. 505,281.

My invention relates to cupola furnaces and particularly to methods and means for preventing or decreasing the discharge of fumes into the atmosphere with the products of combustion from the furnace.

In melting metals in cupola furnaces, large amounts of fumes consisting largely of metal vapor and metallic substances such as the oxides and sulfides of the metals are produced and when discharged into the air with the products of combustion from the furnace, constitute a serious nuisance. The production of fumes is particularly pronounced when non-ferrous metals and alloys such as bronzes are melted in cupola furnaces because of the relatively volatile nature of the metal vapors and metallic substances produced. Moreover, the fumes produced in melting non-ferrous metals are often poisonous and when discharged into the air are a menace to the health of the community and of the operators in the plant where the cupola furnace is used. The objections to cupola furnace operation, due to the attendant smoke and fumes produced, are especially serious in cities and metropolitan areas where there are ordinances forbidding the discharge of smoke into the atmosphere.

The co-pending application of S. P. Miller, Serial No. 505,305 filed December 29, 1930, describes a process and apparatus in which the fumes produced in a cupola furnace are precipitated by the action of a dense uniform spray of liquid. I have now discovered that the fumes produced in cupola furnaces are more readily precipitated by the action of a liquid spray when the admixture of air with the hot gases prior to the step of precipitating the fumes is prevented.

While I do not wish to confine my invention to any particular theory of operation, I believe that the exclusion of air from the hot gases prior to precipitation of the fumes enables me to effect the precipitation of the metallic constituents of the fumes in an unoxidized form such as metallic dust or particles and as metallic sulfides rather than as the oxides of the metals. The liquid when projected forcefully in the form of a fine spray or mist through the fumes appears to collect on the particles as nuclei burdening the particles with water and causing agglomeration of the wet particles into droplets which are too heavy to remain in suspension in the products of combustion. The fumes are thereby precipitated forming a sludge containing the metallic substances. The action of liquid spray appears to be particularly effective in precipitating the fumes in an unoxidized form and results in the formation of a sludge of precipitated material that differs in appearance and properties from that resulting when the fumes while at high temperatures come in contact with air prior to precipitation.

In ordinary cupola furnace operation where the fuel and metal to be melted are introduced into the furnace every fifteen or twenty minutes, it is common practice to leave the charging door open and allow air to be drawn into the furnace by the stack draft so that the air mingles with the hot gases passing out of the furnace. The air thus entering the furnace oxidizes the fumes and therefore they cannot be precipitated as readily as when air is excluded from the fumes.

In accordance with my invention, this difficulty is overcome by preventing the admixture of air with the fumes prior to precipitation and the admission of air at the charging door of the furnace is avoided. Inasmuch as the charging doors of cupola furnaces are frequently not gas-tight, the admission of air is prevented preferably by maintaining the furnace gases at the charging door under substantially neutral or atmospheric pressure so that even though the charging door is left open, air is not drawn into the furnace in substantial amounts. While charging doors are usually in practice not gas-tight and are frequently left open, it is within the scope of my invention to prevent the admixture of air with the combustion gases by the use of a gas-tight charging door which is kept closed except during charging. In this case, the maintenance of equal gas pressures on both sides of the charging door is less important or even unnecessary. Some oxidation of fume-forming material may take place around the tuyéres, and the oxidized material may, in part, persist in oxidized form until it leaves the furnace. The amount of such material is, however, relatively small and its presence does not substantially interfere with the operation of my invention nor neutralize its advantages.

Among the objects of my invention are to prevent or decrease the discharge of fumes produced in cupola furnaces into the air with the products of combustion, to provide apparatus that is inexpensive to construct and operate and which effectively removes the fumes from the products of combustion produced in cupola furnaces and to provide a process by means of which the fumes can be readily precipitated by the action of a spray of liquid and without the admixture of air with the gases prior to the precipitation of the fumes therefrom.

These and other objects and features of my invention will appear from the following description thereof, wherein reference is made to the accompanying figure of the drawing which illustrates diagrammatically a preferred type of apparatus embodying my invention.

In the drawing:

Fig. 1 is a diagrammatic illustration of a preferred form of apparatus embodying my invention, and Fig. 2 is a sectional view of a portion of the apparatus taken on the line 2—2 of Fig. 1.

In the construction shown in the drawing, a cupola furnace 2 is provided with a charging door 4 through which fuel and the metal to be melted are introduced into the furnace. The upper portion of the furnace is provided with a lateral gas off-take 6 which extends substantially horizontally into a chamber 8 wherein the fumes passing from the cupola furnace are precipitated from the products of combustion. The chamber 8 is provided with a rotatable member 10 which may be in the form of a cylindrical roll or provided with a surface having perforations or screen thereon, or constructed in the form of spaced discs or in any other suitable manner for producing a dense uniform spray of liquid.

Liquid is supplied to the chamber 8 and is maintained at a substantially constant level contacting with the lower surface of the rotatable member 10. The liquid which is preferably water is introduced into the chamber by means of the inlet pipe 12 and passes out through the over-flow device 14 communicating with the chamber 8. The member 10 is driven by means of a motor 16 located outside the chamber 8 and capable of rotating the member 10 at high speed. The construction of the apparatus so far described is substantially the same as that described and claimed in the co-pending application of S. P. Miller referred to above.

In my preferred construction, the chamber 8 is provided with a gas line 18 through which the products of combustion containing any fine particles of water and unprecipitated matter swept from the chamber 8 pass to a centrifugal blower 20 driven by a motor 22 which draws the gases through the apparatus and in addition acts as a centrifugal separator to throw water and heavy particles out of suspension. The gases leaving the centrifugal blower 20 pass through the gas line 23 to a filter 24 which may contain nails or other suitable filtering agent for removing further amounts of solid material from the gases. The products of combustion from which the fumes have been removed are then discharged to the atmosphere through the stack 26.

The gas line 18 leading from the chamber 8 to the blower 20 is provided with a valve 28 for controlling the passage of gas from the cupola furnace to the stack or if preferred the valve 28 may be located in the gas line 23 between the blower 20 and filter 24. By suitable adjustment of this valve, I maintain the pressure of the gases at the charging door of the furnace substantially neutral, that is, at substantially atmospheric pressure, so that there is little or no tendency for air to be drawn into the furnace at the charging door even though the door should be left open. The fumes therefore pass from the furnace to the chamber 8 without being admixed with air and the metallic constituents of the fumes are not oxidized.

In the construction illustrated in the drawing, I have shown a conduit 30 passing from the gas line 23 at a point between the blower 20 and filter 24 to the gas off-take 6 or, as shown at 30′, to the gas line 18 instead of to gas off-take 6. Suitable valves 32 and 34 control the passage of the gases and products of combustion through the gas line 23 and conduit 30, the latter serving to recirculate a portion of the gases from the blower 20 back to the chamber 8. The recirculation of a portion of the gases carrying entrained moisture and some solid suspended matter either through line 30 to and through chamber 8, etc., or through line 30′ into line 18 has been shown to facilitate the deposition from the gas of solid suspended matter.

In the preferred form of my invention I introduce water into the top of the filter 24 by means of pipe 25 and spray head 27 to wash the gases passing through and to keep the filling material moistened. This water with any dissolved material or sludge is run from the filter 24 to the inlet 12 of chamber 8 through the pipe 29. This circulation is effected by means of a pump 31 if the filter 24 is low with respect to chamber 8, but may be effected by gravity alone if the filter 24 is sufficiently elevated.

In operating the apparatus described, the metal to be melted, which may be a non-ferrous metal or alloy such as bronze, is charged into the cupola through the charging door 4 with the fuel for melting the metal. The fuel employed may be any suitable material but when non-ferrous metals are melted, the fuel is preferably coke having low ash and sulfur content such as pitch coke. The fuel is ignited and air introduced below the fuel bed as in ordinary cupola furnace operation. The fumes produced during the melting and treatment of the metal pass upwardly through the furnace 2 to the gas off-take 6. Additional fuel and metal may be added from time to time as required and the charging door 4 may be allowed to remain open as in ordinary practice. The operation of the fume arrester is initiated by turning on the water supplied to the chamber through the inlet 12 and the motors 16 and 22 which drive the member 10 and the blower 20 respectively, are energized.

The temperature of the fumes and products of combustion entering the chamber 8 through the gas off-take 6 will ordinarily not exceed about 700° C. In the chamber 8, the fumes and gases are subjected to the action of a dense uniform spray of liquid projected forcefully through the stream of gases by the rotation of the member 10 at high speed in contact with the surface of the water in the chamber. The liquid employed is introduced into the chamber in a typical example at the rate of from five to seven gallons per minute and the level of the water maintained constant by the over-flow device 14. The fumes, in passing through the chamber, are cooled to about 80 or 90° C. and are drenched with water, a substantial portion being precipitated by the water spray and collecting in the chamber. The water collecting on the metallic particles of the condensed metallic vapor increases the size and weight of the particles and probably causes the particles to gather in droplets and precipitate in the chamber carrying the metallic substances with them, forming a sludge in the bottom of the chamber. The water also absorbs carbon dioxide and sulfur dioxide if such be present in the gases and becomes slightly acid in character during the operation.

The products of combustion and any unprecipitated fumes as well as water in the form of droplets, mist and vapor remaining in the gases then pass from the chamber 8 through the gas line 18 to the centrifugal blower 20. The blower 20 acts as a centrifugal separator which throws the water particles, mist and condensed vapor and the metallic substances that have been increased in size and weight by the water, out of suspension, thereby removing further amounts of the fumes from suspension. The gases together with material removed from suspension then pass through the gas line 23 to the filter 24 where additional material is removed before the products of combustion are discharged to the atmosphere. The material removed from suspension by the blower 20 on passing to the filter 24, is removed with water and sludge passing to the bottom of the filter 24 through the drain 37 or is recirculated to the inlet 12 through the pipe 29 by the pump 31.

In some instances, I do not pass all of the gases directly from the blower 20 to the filter but pass a portion of the gases back through the conduit 30 to the chamber 8. When this portion of the apparatus is in use, the valves 32 and 34 are adjusted to cause a substantial portion of the gases to be returned to the chamber and again subjected to the action of the water spray and the centrifugal blower so that each volume of the gases and fumes is subjected to repeated treatments to precipitate fumes therefrom before being discharged into the atmosphere. I have found that when the apparatus is controlled as described above to prevent the introduction of air into the furnace, the fumes are precipitated comparatively easily and the material precipitated from the products of combustion forms a sludge that is of different color from that produced when air is admixed with the gases prior to the precipitation of the fumes. For example, when metals or alloys containing zinc, copper or lead are melted in a cupola furnace, the sludge of precipitated constituents produced is dark in color indicating the presence of finely divided metals and the sulfides thereof, whereas when the charging door is left open and the pressure is not controlled to prevent the admission of air into the furnace, the resulting sludge collecting in the apparatus is lighter in color indicating the presence of the oxides of the metals contained in the fumes.

Although I have illustrated and described a preferred embodiment of my invention, I do not intend that the invention should be limited thereby since the process may be carried out in apparatus other than that herein described and both the process and apparatus may be varied in construction and procedure without departing from the spirit of the invention.

I claim:

1. The combination comprising a cupola furnace having a charging opening through which fuel and metal to be melted are introduced into the furnace, a conduit through which fumes produced in the furnace pass therefrom and means in said conduit for controlling the passage of fumes therethrough to substantially obviate the admission of air into the furnace through the charging opening.

2. The combination comprising a cupola furnace having a charging opening through which fuel and metal to be melted are introduced into the furnace, a conduit through which fumes produced in the furnace pass therefrom and a valve in said conduit adjustable to control the passage of fumes from the furnace to prevent the admission of air to the furnace through the charging opening.

3. The combination comprising a cupola furnace having a charging opening through which fuel and metal to be melted are introduced into the furnace, a conduit through which fumes produced in the furnace are removed therefrom, means in said conduit for controlling the passage of fumes therethrough to substantially obviate the admission of air into the furnace through the charging opening, and means for precipitating constituents of the fumes produced in said furnace.

4. The combination comprising a cupola furnace having a charging opening through which fuel and metal to be melted are introduced into the furnace, a conduit through which fumes produced in the furnace pass therefrom, means in said conduit for controlling the passage of fumes therethrough to substantially obviate the admission of air into the furnace through the charging opening and means for producing a spray of liquid in said conduit through which the fumes are passed to effect the precipitation of constituents thereof.

5. The combination comprising a cupola furnace having a charging opening through which fuel and the metal to be melted are introduced into the furnace, a gas conduit, connected to the furnace through which fumes produced in the furnace are passed, a chamber connected to said conduit, said chamber containing water and a member dipping into the water, means for rotating said member at high speed to distribute the water in a spray throughout the chamber, a gas line connected to said chamber through which the washed fumes are passed, a filter in said gas line and means for controlling the passage of fumes from the furnace to prevent the admission of air into the furnace at the charging opening.

6. The method of operating a cupola furnace having a charging opening which comprises maintaining sufficient pressure upon the gases in the furnace adjacent the charging opening to prevent the admission of air therethrough.

7. The method of operating a cupola furnace having a charging opening which comprises maintaining sufficient pressure upon the gases in the furnace adjacent the charging door opening to prevent the admission of air therethrough and precipitating metallic substances contained in the fumes produced in the furnace in substantially unoxidized form.

8. The method of treating fumes produced by the melting of metal in a cupola furnace which comprises successively subjecting the fumes to the action of water spray, a centrifugal separator and filtering operations while maintaining constituents of the fumes in substantially unoxidized form.

9. The method which comprises passing the products of combustion and fumes produced by the melting of metal in a cupola furnace through a chamber, precipitating constituents of the fumes by the action of a spray of water, withdrawing the products of combustion and unprecipitated fumes from the chamber and recirculating a portion of the fumes and products of combustion again through said chamber.

10. The method of melting bronzes which tend to produce fumes containing metallic substances such as metal vapor or metallic sulfides when fused in a cupola furnace with carbonaceous fuel which comprises the process steps: adjusting draught through the cupola so as to substantially obviate the admixture of air with the fumes when the fumes are at a temperature sufficiently high to be readily oxidized by the oxygen of the air, subjecting the fumes containing unoxidized metallic constituents to the action of a dense spray of water to precipitate the metallic constituents thereof and thereafter filtering the fumes.

11. The combination comprising a cupola furnace, a fume arrester, a conduit leading from said furnace to said fume arrester, and means for recirculating at least a portion of the gases and fumes produced in said furnace through said fume arrester.

12. The combination comprising a cupola furnace, a fume arrester, a conduit leading from said furnace to said fume arrester, a gas line leading from said fume arrester, means for adjusting draught through the cupola so as to substantially obviate the admixture of air with the gases and fumes produced in said furnace prior to their passage to said fume arrester and means for returning at least a portion of the gases and fumes from the gas line to said conduit.

13. The combination comprising a cupola furnace, a fume arrester through which fumes produced in said furnace are passed, and means for removing from suspension material passing out of the fume arrester in precipitated form by centrifugal action.

14. The method of treating fumes produced by the melting of metals in a cupola furnace which comprises the steps of precipitating constituents of the fumes carried with products of combustion from the furnace by the action of a spray of water and thereafter separating from the products of combustion materials remaining in suspension therein by centrifugal action.

15. The combination comprising a cupola furnace for melting metals, said furnace having a charging opening through which metal to be melted and fuel are introduced into the furnace, and means for maintaining an internal pressure of at least atmospheric in the neighborhood of the charging opening to prevent the introduction of air into the furnace through said opening.

16. The process of preventing the discharge of fumes into the atmosphere produced in the melting and refining of metals in a cupola furnace having a charging opening for the introduction of metal to be melted and fuel, which comprises maintaining an internal pressure of at least atmospheric in the neighborhood of the charging opening to prevent the introduction of air into the furnace and the oxidation of the oxidizable constituents of the fumes, and precipitating the fumes in the unoxidized condition by contacting them with a spray of liquid.

17. The process of preventing the discharge of fumes into the atmosphere produced in the melting and refining of metals in a cupola furnace, which comprises passing products of combustion and fumes produced in the melting of the metals through a path containing a finely divided spray of liquid and recirculating at least a portion of the products of combustion and fumes through said path into contact with the spray of liquid.

18. The combination comprising a cupola furnace, a chamber connected to said furnace through which fumes produced in the furnace are passed, means for maintaining a substantially constant level of liquid in said chamber, means contacting with the liquid to produce a spray of liquid throughout the chamber, through which the fumes pass in their passage through said chamber, and means associated with the chamber for controlling the passage of fumes therethrough to substantially obviate the admission of air into the furnace, whereby oxidation of the fumes is prevented.

19. The process of preventing the discharge of fumes into the atmosphere produced in the melting and refining of metals in a cupola furnace which comprises maintaining a non-oxidizing condition in the fumes and products of combustion produced in the melting of the metals in the cupola, and precipitating the fumes in the unoxidized condition by contacting them with a spray of liquid.

In witness whereof I hereunto set my hand.

GREGORY EDWARD McCLOSKEY.

CERTIFICATE OF CORRECTION.

Patent No. 1,884,048.                                                October 25, 1932.

GREGORY EDWARD McCLOSKEY.

It is hereby certified that error appears in the printed specification of the above numbered patent requiring correction as follows: Page 2, line 128, strike out the word "the"; page 4, line 64, claim 7, strike out the word "door"; and line 124, claim 13, for "precipitated" read "unprecipitated"; and that the said Letters Patent should be read with these corrections therein that the same may conform to the record of the case in the Patent Office.

Signed and sealed this 13th day of December, A. D. 1932.

(Seal)                                                  M. J. Moore,
Acting Commissioner of Patents.